United States Patent [19]

Ewener et al.

[11] Patent Number: 4,908,082

[45] Date of Patent: Mar. 13, 1990

[54] METHOD FOR IN-SITU REPAIR OF SOLVENT DEWAXING FILTER CLOTHS

[75] Inventors: Patrick C. Ewener, Sarnia, Canada; Duncan J. Bristow, Bridgewater, N.J.; Scott W. Armstrong, Sarnia, Canada; Louis C. Dallaire, Sarnia, Canada; John A. Thompson, Wyoming, Canada

[73] Assignee: Exxon Research and Engineering Company, Florham Park, N.J.

[21] Appl. No.: 297,278

[22] Filed: Jan. 13, 1989

[51] Int. Cl.⁴ .............................................. B32B 35/00
[52] U.S. Cl. ...................................... 156/94; 156/281; 156/307.3; 156/330; 264/36; 427/140; 428/63
[58] Field of Search ................... 156/94, 98, 281, 330, 156/307.3; 264/36; 427/140; 428/63

[56] References Cited

U.S. PATENT DOCUMENTS

| | | | |
|---|---|---|---|
| 4,047,994 | 9/1977 | Komatsu | 156/98 |
| 4,180,166 | 12/1979 | Batdorf | 427/140 X |
| 4,464,494 | 8/1984 | King et al. | 523/400 |
| 4,519,856 | 5/1985 | Lazzara | 156/94 X |
| 4,568,589 | 2/1986 | Briggs | 428/63 |
| 4,784,777 | 11/1988 | Dellinger | 427/140 X |

OTHER PUBLICATIONS

Kirk-Othmer Encyclopedia of Chemical Technology, 2nd Revised Edition, vol. 8, 1965, p. 311.
McGraw-Hill Encyclopedia of Science & Technology, vol. 10, 1971, pp. 544-545.

*Primary Examiner*—Robert A. Dawson
*Attorney, Agent, or Firm*—Joseph J. Allocca

[57] ABSTRACT

A method is disclosed for the in-situ repair of damaged filter cloths in solvent dewaxing filters. The damage that can be repaired can be either or both of tears or holes. The method comprises thoroughly washing the filter cloth in the area of the damage to remove wax and oil, applying a quantity of solvent resistant adhesive to the damaged area such that the area of treatment extends beyond the hole or tear and adhesive overlays onto undamaged cloth, inserting pre-cut portions of filter cloth into the damage so as to completely fill the hole or tear but not create a bulge or cloth buildup in the face of the filter cloth where required and, finally, and optimally applying a final coating of adhesive over the repaired area.

25 Claims, No Drawings

METHOD FOR IN-SITU REPAIR OF SOLVENT DEWAXING FILTER CLOTHS

BRIEF DESCRIPTION OF THE INVENTION

The present invention is a method for repairing damaged areas of filter cloths used in solvent dewaxing service. Damage in filter cloths take the form of holes, tears, cuts or rips. Such damage permits the passage of wax through the damaged area and into the filtered solution resulting in the presence of wax in the oil solution which leads to very hazy off specification oil filtrate.

It has been discovered that such damaged areas can be repaired by the use of a solvent resistant adhesive optionally combined with the use of portions of filter cloth patch material.

The method comprises the steps of carefully and thoroughly cleaning the filter cloth in the area of the damage so as to remove oil and wax from the cloth. The cleaned area should extend some distance beyond the immediate area of damage, e.g. a six inch radius from the edge of the damage. A solvent resistant adhesive is then applied to the damage area. The area of application covers the immediate area of damage and additionally extends at least ½ inch beyond the edges of the immediate damage area, and preferably covers the entire previously described cleaned area. Adhesive is applied to the filter cloth so as to thoroughly wet the area to be repaired. In some instances, as when the hole is small or the tear minor (when there has been no loss of filter cloth material) the repair can comprise solely the cleaning of the damage area and the application of sufficient adhesive to close off the hole or tear. In other instances where the damage has been more extensive, involving the loss of filter cloth material in the damage area, it will be necessary to use a quantity of filter cloth as patch material. In those instances, following the application of the adhesive, pieces of filter cloth may be inserted into the damaged area, that is, small pieces of filter cloth are shaped and fitted into the hole, tear, rip or slice to thoroughly fill the damaged area.

Lastly, a final coat of adhesive is applied to the entire damage area and overlaying the aforesaid cleaned area with a final bead of adhesive applied directly to the edges of the damage area to prevent formation of cracks or depressions along such edges.

Alternatively the hole, slice, rip or tear can be repaired by a procedure involving cleaning and application of adhesive, but using a pre-cut portion of filter cloth slightly larger than the hole, etc. This portion of repair cloth can be applied onto the top of the filter cloth creating a patch. The patch material is carefully positioned to overlap the damage area and smoothed out under the wire commonly used to hold the filter cloth in place on the filter drum, to create a flush patch. The patch material can be applied to the damage area as is or preferably can first be thoroughly wetted with adhesive. The repaired area can then receive a final coating of adhesive and the sealing bead as previously described.

BACKGROUND OF THE INVENTION

Solvent dewaxing of waxy hydrocarbon oils involves the direct or indirect chilling of the solvent/oil mixture to a temperature low enough to precipitate out the wax in the oil. The precipitated wax is separated from the solvent/oil mix by filtration using rotary vacuum or pressure filters. The filter medium used is a natural or synthetic textile cloth (usually non-woven) which is held in place on the outer surface of the filter drum by means of caulking bars and tightly wrapped with wire. The normal life expectancy of the filter cloth ranges from one to four years, after which the well worn cloth is replaced in its entirety.

Filter cloths are also susceptible to damage which is evidenced by a loss in retentive ability indicated by the presence of wax in the filtrate. Such damage takes the form of holes, rips, tears, cuts, gaps etc. and can be caused by any number of things. The wax removal doctor blade in the filter can snag the surface of the cloth, improper installation, minor unobserved defects in the cloth, etc. can lead to localized damage and failure of the cloth.

Such localized damage as compared to a general wearing out of the cloth, is treated at the site of the damage rather than by total replacement of the cloth.

The currently practiced site specific filter cloth repair technique involves blanking off the damaged cloth section by sliding a thin metal shim or plate under the hold down wires on the filter drum and onto the face of the filter cloth over the area of damage. This method does not always prove satisfactory because there is no true seal between the cloth and the overlying metal patch and the metal patch cannot be effectively used if the damage is near the edges of the drum or adjacent the caulking bars in the drum.

THE PRESENT INVENTION

The present invention constitutes a method for repairing localized damage to filter cloths used in solvent dewaxing process. The method involves the use of a solvent resistant adhesive. When the damage to the filter cloth is accompanied by actual loss of filter cloth material in the damage area the repair procedure, in addition to utilizing the adhesive employs pieces of the filter cloth material itself to form smooth, wax impermeable patches, on the filter cloth.

In the process, the filter cloth is carefully and thoroughly cleaned in the area of the damage in the area immediately surrounding the damage, preferably up to six inches from the edges of the damage. This cleaning is practiced so as to remove wax and oil from the filter cloth and facilitate the thorough wetting of the filter cloth with the adhesive so that strong bonds and complete seals will result. This cleaning can involve the use of wax solvents, oil solvents or both and preferably a sequence of each, repeated as often as necessary to remove the wax and oil from the filter cloth. After this treatment the cleaning solvent itself is washed from the cloth using a solvent which is allowed to evaporate from the cloth.

Following this evaporation step the cleaned area of filter cloth is coated with a layer of solvent resistant adhesive. Since solvent dewaxing processes involve the use of ketone solvents, aromatic solvents, mixtures of ketone and aromatic solvents, ethers, such as methyl tert-butyl ether etc, and mixtures thereof, the adhesive used must be resistant to the action of such solvents. Other solvents include normally liquid hydrocarbons such as hexane and cyclohexane, alcohols, such as isopropyl alcohol and methanol, fully halogenated hydrocarbons such as carbon tetrachloride, and water, dimethyl formamide, and dioxane. It has been discovered that the filter cloth repair technique of the present invention using epoxy resin based adhesives, does not function in a liquified, normally gaseous hydrocarbon autorefrigerative solvent system. Other solvents which should be avoided include methylene chloride, cresol, acetic acid, chloroform, n-methyl-2-pyrrolidone.

Adhesives which are used in the present invention are epoxy resin formulations comprising the base epoxy resin component and optionally, a hardener component and a catalyst. To insure complete wetting of the cleaned filter cloth it is necessary that the epoxy resin formulation be used before it becomes too viscous.

Adhesives which can be used comprise those which are (a) single part epoxies and include no hardener or catalyst or (b) two or three part adhesives which may be blended using 0 to 90 parts by wt of hardener together with a portion of catalyst sufficient to react with the portion of epoxy resin used. As there are many catalyst types, the amount is calculated based on the stoichiometric amount required.

It has been discovered that this adhesive stands up to the dewaxing solvent under repeated cycles of temperature extremes normally encountered in solvent dewaxing filter. The dewaxing filter surfaces are routinely exposed to temperature swings between the temperature of about $-10°$ to $-20°$ C. to $80°$ C. + (i.e. $90°$ to $100°$ C. swing). In the course of a day the filter surface can undergo as many as 6 to 8 temperature cycles when hot ketone is used to wash the filter to remove accumulated wax not otherwise removed by the doctor blade in the filter drum. The present filter cloth repair technique withstands such wide and repeated temperature swings without deterioration.

The base epoxy resin component is typically a reaction product of bisphenol A and epichlorohydrin, however other epoxy resins can be used so long as it is not an aliphatic epoxy resin as it has been observed that adhesives containing aliphatic epoxy resins do not exhibit good resistance to ketone solvents.

Suitable hardeners or curing agents are polyamide or amidoamine low temperature, low exotherm curing agents.

Typical catalysts comprise amines, amides, anhydrides, mercaptans, organic acids, phenols, etc. many of which can be used with Bisphenol A resin to obtain a flexible, stable formulation.

The various components which go to make up the adhesive formulation are available from commercial sources. Suitable reaction products of bisphenol A and epichlorohydrin are available, for example, from Shell Chemical Company under the designation Epon 828, Epon 830, Epon 825 and Epon 826; from Reichold Chemical Company under the designation EpoTuf 37-139, EpoTuf 37-140, EpoTuf 37-141; from Ciba Geigy Corporation under the designation Araldite 6005, 6010 and 6020; from Celanese Corporation as Epi-Rez 508, 509 and 510; and from Dow Chemical Company under the designation D.E.R. 330, 331, 332, 317 and 337. Suitable low temperature, low exotherm polyamide or amidoamine curing agents are available, for example from Henkel Corp. under the designation Versamid 140 (which has an amine value of about 370–400), Versamid 115, Versamid 125 and Versamid 150 or Genamid 2000 (which has an amine value of about 580–620) and Genamid 250; from Ciba Geigy Corporation under the designation 815, 825 and 840 and from Shell Chemical Company under the designation V-15, V-25 and V-40.

The base epoxy resin component comprises the reaction product of bisphenol-A and epichlorohydrin having a viscosity in the range of about 7000 to 20,000 centipoise preferably 10,000 to 16,000 centipoise at $25°$ C. (ASTM D445) with a weight per epoxide (WPE) of about 175–210, preferably about 185–195.

As previously stated, the hardener or curing agent is typically a polyamine or amidoamine low temperatures, low exotherm curing agent such as a condensation product of polyamine with fatty acids or dimer acids, and having an amine value of between about 85–620, preferably about 370–620, more preferably about 370–400 or 580–620.

A preferred catalyst is dimethyl amino methyl phenol (DMP).

In practicing the repair of damaged filter cloth, the area to be repaired must be rinsed clean of waxy residue to ensure maximum bonding, since the presence of wax in the filter cloth will inhibit adhesive bonding to the cloth. All material within six inches of the filter damage should be thoroughly cleaned. The following sequence should be used:

1. Locate all cloth lacerations, holes, tears, rips, cuts, gaps, gauges etc;
2. Repeatedly rinse repair area with oil/wax solvents, preferably hot solvent such as hot varsol;
3. Repeatedly rinse area with acetone (to rinse away solvent) and allow area to dry before adhesive application.

An air purge may be applied to repair area to shorten acetone drying time.

The repair area should look clean (not waxy) after the cleaning procedure. If the area still looks waxy, then the cleaning procedure must be repeated using more hot solvent. If the cleaning procedure is not used or used negligently then good adhesive bonding is not possible.

In preparing the adhesive it is necessary that the components not be used after the shelf life has expired as old components will jeopardize the adhesive quality.

In the following examples the adhesive consisted of 90 parts by weight of the base epoxy resin (a condensation product of bisphenol A and epichlorohydrin) available from Dow Chemical Company and known as DER-331; 60 parts by weight of hardener Versamid 140 available from Henkel Chemicals, and 2 parts by weight of catalyst DMP-30 available from Rohm and Haas.

The adhesives are prepared by combining the adhesive components in the suggested ratios and mixing until the paste is evenly constituted (3–4 min). Although the adhesive will remain fluid for up to 12 hours if not cured by heating, the adhesive must be applied to the repair area immediately upon preparation since the working viscosity increases with time and a more viscous adhesive solution will have difficulty penetrating (wetting) the filter cloth resulting in substandard bond strength.

In repairing damaged areas there are two general types of damage which are encountered, holes and cuts or rips.

Repairing holes is accomplished as follows:

Prepare the adhesive as above and apply directly into the hole and to the area surrounding the hole. The surrounding area application should be no less than ½" from the outside edge of the hole. This will aid in the physical entanglement of the adhesive to the filter material.

While this first application is seeping into the filter cloth, the hole should be filled once more with adhesive. The edges of the damage area are then brought together so as to close off the damage an additional layer of adhesive can be applied over the damage area. When the damage is accompanied by loss of filter cloth material, small pre-cut pieces of filter material are inserted into the hole, as many being inserted as can be accommodated without creating a build-up or bulge in the repair area. Pre-cut pieces of spare filter cloth material should be approximately $1/16'' \times 1/16'' \times 1/16''$ in size. Then a second application of a small amount of adhesive should be made directly to the hole, completely covering and wetting the newly inserted pieces of filter cloth.

Very large holes (greater than ½ inch diameter) can be filled using a large shaped piece of filter cloth, with the addition of smaller pieces if necessary. Any large filler piece must be impregnated with adhesive prior to being inserted into the hole.

A final thin coating of adhesive can be spread over the entire repair area and lastly, a small quantity of adhesive ($\sim 1/16''$ in height) should be dabbed directly onto the hole. This mound of adhesive will prevent the formation of a small crater in the hole, leaving the repair area flush with the filter cloth.

At this point, the repair should be ready for curing. Slices, cuts and rips are handled similarly.

It is important to note that if there has been the loss of filter cloth material in the area of the slice in the filter cloth, then this area should be repaired as mentioned for hole repairs whereby filter material chunks are used to help plug the hole or gap.

Using a spatula, force back the sliced edges of the filter material and generously apply adhesive into the slice and under the folded back filter material, especially at the ends of the slice damage. This allows for maximum adhesive contact throughout the entire cross-section of the material repair. Next, a layer of adhesive should be spread on the surrounding repair area. This coating of adhesive should extend outwards at least one inch from the actual slice damage.

All large gaps in the filter material can be filled at this time (per hole repair procedure—using pre-cut pieces of filter cloth). A final thin coating of adhesive can be spread over the entire repair area and lastly, a thin bead of adhesive ($\sim 1/16''$) can be deposited directly on the slice in the material. This final bead of adhesive will inhibit the formation of a crack or valley along the slice and will leave the repair flush with the filter cloth.

Alternatively, in addition to or instead of forcing small pieces of filter cloth material into the hole or gap, one can use somewhat larger pieces of material, pieces large enough to cover or patch the entire hole or gap and overlap onto the undamaged surface of the filter cloth. This patch is applied over the damaged area of filter cloth but carefully inserted under the wires used to hold the filter cloth tightly to the filter. This patch material can be thoroughly wetted with the adhesive prior to being applied to the face of the filter cloth and carefully inserted under the hold down wires. Alternatively the dry patch material can be applied to the adhesive prepped face of the filter cloth and carefully worked into place, after which it is thoroughly wetted with a layer or layers of adhesive. Best patch application technique would be to thoroughly wet both the patch and area to be patched with adhesive to ensure that both filter cloth surfaces are wetted completely.

It has been observed that the adhesive used required 12 hour to cure at 23° C. This cure time however, can be shortened to reduce down time of the filter. Curing with a heat lamp or steam late successfully shortened the hardening time and it is preferred that the steam plate cure technique be used. Direct contact to a steam heated aluminum plate will harden (cure) the adhesive in 1 hour. The heat lamp cure time as slightly longer but depends on the distance of the lamp from the adhesive surface and the ease with which the surface of the filter cloth can be approached with the particular heating element.

When using the steam plate curing procedure it is preferred that the repaired area be covered with a protective high temperature plastic sheet coating (e.g. polyparabanic acid) and bring the seam heated aluminum plate into direct contact with the protective coating. The steam heated plate is rested on repair area for 1 hr. after which both the steam plate and plastic sheet are removed after curing.

In a separate demonstration a 3 inch × 3 inch piece of filter cloth was glued to a newly reclothed filter drum employed in propane dewaxing using the same adhesive described above. This piece of filter cloth was not used to repair any damage but just as a demonstration test. In so far as the filter cloth was new and had not been used for any filtrations it was not rigorously cleaned prior to the application of the adhesive. In the test the adhesive was applied to the filter cloth and the $3'' \times 3''$ patch placed on top of the adhesive. A bead of adhesive was applied around the perimeter of the patch. The glue was then cured for about 2 weeks in the open atmosphere (about 90° F. air temperature). In filtration service, hot kerosine washes were periodically used to clean the filter cloth of accumulated wax not otherwise removed by the doctor blade on the filter drum. After 2 months the patch area was examined and it was seen that one side of the path had lifted from the surface. The three remaining sides were still holding but with less strength than had been observed in the case of patches exposed to ketone solvent system. Although stronger bonds may be possible if the surface is more rigorously cleaned, it is believed the present system is not well suited for use in propane systems.

What is claimed is:

1. A method for the in-situ repair of damaged filter cloths used in solvent dewaxing filters, said method comprising the steps of:
   (a) thoroughly washing the damaged area with oil/-wax solvent to remove wax and oil therefrom;
   (b) rinsing the washed area with a rinse solvent to remove the oil/wax solvent used in step (a) from the damage area;
   (c) drying or evaporating the rinse solvent from the damage area;
   (d) applying an epoxy based adhesive to the damage area thoroughly wetting the damage area; and
   (e) curing the adhesive to effect the complete repair of the damage area.

2. The method of claim 1 wherein multiple layers of epoxy based adhesive are applied to the damage area prior to effecting the curing step (e).

3. The method of claim 1 or 2 wherein small, pre-cut pieces of filter cloth are inserted into the damage area following the application of adhesive of step (d) but prior to the curing of step (e), the quantity of filter cloth material inserted into the damage area being sufficient to close off the damage without creating a build up or bulge.

4. The method of claim 3 wherein the small, pre-cut pieces of filter cloth are themselves thoroughly wetted with adhesive prior t being inserted into the damage area.

5. The method of claim 1 or 2 wherein a pre-cut piece of filter cloth is overlayed on the damage area to create a patch thereon following the application of adhesive of step (d) but prior to the curing of step (e).

6. The method of claim 5 wherein the pre-cut piece of filter cloth used as a patch is itself thoroughly wetted with adhesive prior to being applied to the damage area.

7. The method of claim 3 wherein a final layer of adhesive is applied to the damage area following insertion of the small pre-cut pieces of filter cloth but prior to the curing step.

8. The method of claim 4 wherein a final layer of adhesive is applied to the damage area following insertion of the adhesive wetted, small pre-cut pieces of filter cloth but prior to the curing step.

9. The method of claim 5 wherein a final layer of adhesive is applied to the damage area following application of the overlay of filter cloth patch material to the damage area but prior to the curing step.

10. The method of claim 6 wherein a final layer of adhesive is applied to the damage area following application of the overlay of the thoroughly adhesive wetted filter cloth patch material to the damage area but prior to the curing step.

11. The method of claim 1 or 2 wherein the epoxy resin adhesive is a single part epoxy containing no hardeners or catalyst.

12. The method of claim 11 wherein the epoxy resin is not aliphatic.

13. The method of claim 1 or 2 wherein the epoxy adhesive is a multi-component adhesive comprising an epoxy resin, a hardener and a catalyst.

14. The method of claim 13 wherein the epoxy resin is not aliphatic.

15. The method of claim 14 wherein the epoxy resin is a reaction product of bisphenol A and epichlorohydrin, the hardener constitutes from 0 to 90 parts by weight of a polyamide or amido amine and the catalyst is selected from amines, amides, anhydrides, mercaptans, organic acids, phenols, and mixtures thereof.

16. The method of claim 3 wherein the epoxy resin adhesive is a single part epoxy containing no hardener or catalyst.

17. The method of claim 16 wherein the epoxy resin is not aliphatic.

18. The method of claim 5 wherein the epoxy resin adhesive is a single part epoxy containing no hardener or catalyst.

19. The method of claim 18 wherein the epoxy resin is not aliphatic.

20. The method of claim 3 wherein the epoxy adhesive is a multi component adhesive comprising an epoxy resin, a hardener and a catalyst.

21. The method of claim 20 wherein the epoxy resin is not aliphatic.

22. The method of claim 21 wherein the epoxy resin is a reaction product of bisphenol A and epichlorohydrin, the hardener constitute 0 to 90 parts by weight of a polyamide or amido amine and the catalyst is selected from amines, amides, anhydrides, mercaptans, organic acids, phenols and mixtures thereof.

23. The method of claim 5 wherein the epoxy adhesive is a multi component adhesive comprising an epoxy resin a hardener and a catalyst.

24. The method of claim 23 wherein the epoxy resin is not aliphatic.

25. The method of claim 24 wherein the epoxy resin is a reaction product of bisphenol A and epichlorohydrin, the hardener constitutes 0 to 90 parts by weight of a polyamide or amido amine and the catalyst is selected from amines, amides, anhydrides, mercaptans, organic acids, phenols and mixtures thereof.

* * * * *